(12) United States Patent
Nakata et al.

(10) Patent No.: US 11,907,679 B2
(45) Date of Patent: Feb. 20, 2024

(54) ARITHMETIC OPERATION DEVICE USING A MACHINE LEARNING MODEL, ARITHMETIC OPERATION METHOD USING A MACHINE LEARNING MODEL, AND TRAINING METHOD OF THE MACHINE LEARNING MODEL

(71) Applicant: Kioxia Corporation, Minato-ku (JP)

(72) Inventors: Kengo Nakata, Kawasaki (JP); Asuka Maki, Kawasaki (JP); Daisuke Miyashita, Kawasaki (JP)

(73) Assignee: Kioxia Corporation, Minato-ku (JP)

( * ) Notice: Subject to any disclaimer, the term of this patent is extended or adjusted under 35 U.S.C. 154(b) by 559 days.

(21) Appl. No.: 16/818,823

(22) Filed: Mar. 13, 2020

(65) Prior Publication Data

US 2021/0089271 A1 Mar. 25, 2021

(30) Foreign Application Priority Data

Sep. 19, 2019 (JP) ................................. 2019-170682

(51) Int. Cl.
*G06F 7/48* (2006.01)
*G06N 20/20* (2019.01)
*G06N 3/082* (2023.01)
*G06N 5/04* (2023.01)

(52) U.S. Cl.
CPC ............... *G06F 7/48* (2013.01); *G06N 3/082* (2013.01); *G06N 5/04* (2013.01); *G06N 20/20* (2019.01)

(58) Field of Classification Search
CPC . G06F 7/48; G06N 3/082; G06N 5/04; G06N 20/20; G06N 3/0481; G06N 3/0454
See application file for complete search history.

(56) References Cited

U.S. PATENT DOCUMENTS

| 10,417,560 B2 * | 9/2019 | Henry | G06F 17/153 |
| 2015/0006444 A1 | 1/2015 | Tamatsu et al. | |
| 2017/0060854 A1 * | 3/2017 | Zeng | G06F 40/30 |
| 2018/0060744 A1 * | 3/2018 | Achin | G06N 5/04 |

(Continued)

FOREIGN PATENT DOCUMENTS

| JP | 6042274 B2 | 12/2016 |
| JP | 2018-109947 A | 7/2018 |

(Continued)

OTHER PUBLICATIONS

Cai, H. et al. "Once For All: Train One Network and Specialize it for Efficient Deployment" Massachusetts Institute of Technology, arXiv:1908.09791v2, 2020, 13 pages.

*Primary Examiner* — Michael N Opsasnick
(74) *Attorney, Agent, or Firm* — Oblon, McClelland, Maier & Neustadt, L.L.P.

(57) ABSTRACT

An arithmetic operation device is provided that removes a part of parameters of a predetermined number of parameters from a first machine learning model which includes the predetermined number of parameters and is trained so as to output second data corresponding to input first data, determines the number of bits of a weight parameter according to required performance related to an inference to generate a second machine learning model, and acquires data output from the second machine learning model so as to correspond to the input first data with a smaller computational complexity than the first machine learning model.

20 Claims, 14 Drawing Sheets

(56) References Cited

U.S. PATENT DOCUMENTS

| | | | |
|---|---|---|---|
| 2018/0061058 A1* | 3/2018 | Xu | G06N 3/045 |
| 2018/0129935 A1* | 5/2018 | Kim | G06F 17/153 |
| 2018/0189650 A1 | 7/2018 | Wang et al. | |
| 2018/0300624 A1* | 10/2018 | El-Khamy | G06N 3/06 |
| 2018/0341876 A1 | 11/2018 | Ghosh et al. | |
| 2019/0130265 A1 | 5/2019 | Ling et al. | |
| 2019/0180184 A1 | 6/2019 | Deng et al. | |
| 2019/0266015 A1* | 8/2019 | Chandra | G06F 9/505 |
| 2020/0092552 A1* | 3/2020 | Coelho | H04N 19/19 |
| 2020/0092556 A1* | 3/2020 | Coelho | G06T 9/002 |
| 2020/0320748 A1* | 10/2020 | Levinshtein | G06V 10/454 |
| 2022/0138566 A1* | 5/2022 | Lan | G06N 3/08 706/25 |

FOREIGN PATENT DOCUMENTS

| | | |
|---|---|---|
| JP | 6507279 B2 | 4/2019 |
| JP | 2019-082996 A | 5/2019 |
| JP | 2019-106181 A | 6/2019 |

\* cited by examiner

FIG.10

| OUTPUT Ch | INPUT Ch | FIRST LAYER | | | SECOND LAYER | | | ... | L-th LAYER | | |
|---|---|---|---|---|---|---|---|---|---|---|---|
| $C_{out, 1}$ | $C_{in, 1}$ | 0.92 | -0.36 | 0.29 | 0.77 | 1.36 | -1.14 | ... | 0.12 | 0.33 | -0.57 |
| | | 1.37 | -0.52 | 1.46 | 1.28 | 0.23 | 0.72 | ... | -0.51 | -0.87 | 0.02 |
| | | 0.19 | 0.85 | -0.19 | -1.44 | 0.58 | -0.46 | ... | 1.17 | -0.30 | 0.14 |
| | $C_{in, 2}$ | 0.62 | 0.35 | 0.36 | 0.5 | -0.45 | 0.98 | ... | -1.43 | 0.59 | -1.21 |
| | | -0.98 | -1.4 | -0.4 | -0.85 | -0.67 | 1.74 | ... | 0.87 | 0.73 | 0.32 |
| | | 0.45 | -1.23 | 0.29 | 0.96 | -0.75 | 0.09 | ... | 0.27 | -0.85 | -0.44 |
| ... | ... | ... | ... | ... | ... | ... | ... | ... | ... | ... | ... |

FIG.11

| OUT-PUT Ch | INPUT Ch | FIRST LAYER | | | | | | SECOND LAYER | | | | | | ... | L-th LAYER | | | | | | |
|---|---|---|---|---|---|---|---|---|---|---|---|---|---|---|---|---|---|---|---|---|---|
| $C_{out,1}$ | $C_{in,1}$ | 0 | 0 | 0 | 0.62 | 0.35 | 0.36 | 0.77 | 1.36 | -1.14 | 0 | 0 | 0 | ... | 0.12 | 0.33 | -0.57 | | | | |
| | | 0 | 0 | 0 | -0.98 | -1.4 | -0.4 | 1.28 | 0.23 | 0.72 | 0 | 0 | 0 | ... | -0.51 | -0.87 | 0.02 | | | | |
| | | 0 | 0 | 0 | 0.45 | -1.23 | 0.29 | -1.44 | 0.58 | -0.46 | 0 | 0 | 0 | ... | 1.17 | -0.30 | 0.14 | | | | |
| | $C_{in,2}$ | | | | | | | | | | | | | | -1.43 | 0.59 | -1.21 | | | | |
| | | | | | | | | | | | | | | | 0.87 | 0.73 | 0.32 | | | | |
| | | | | | | | | | | | | | | | 0.27 | -0.85 | -0.44 | | | | |
| ... | ... | ... | ... | ... | ... | ... | ... | ... | ... | ... | ... | ... | ... | ... | ... | ... | ... | | | | |

DELETE (first layer shaded block), DELETE (second layer shaded block)

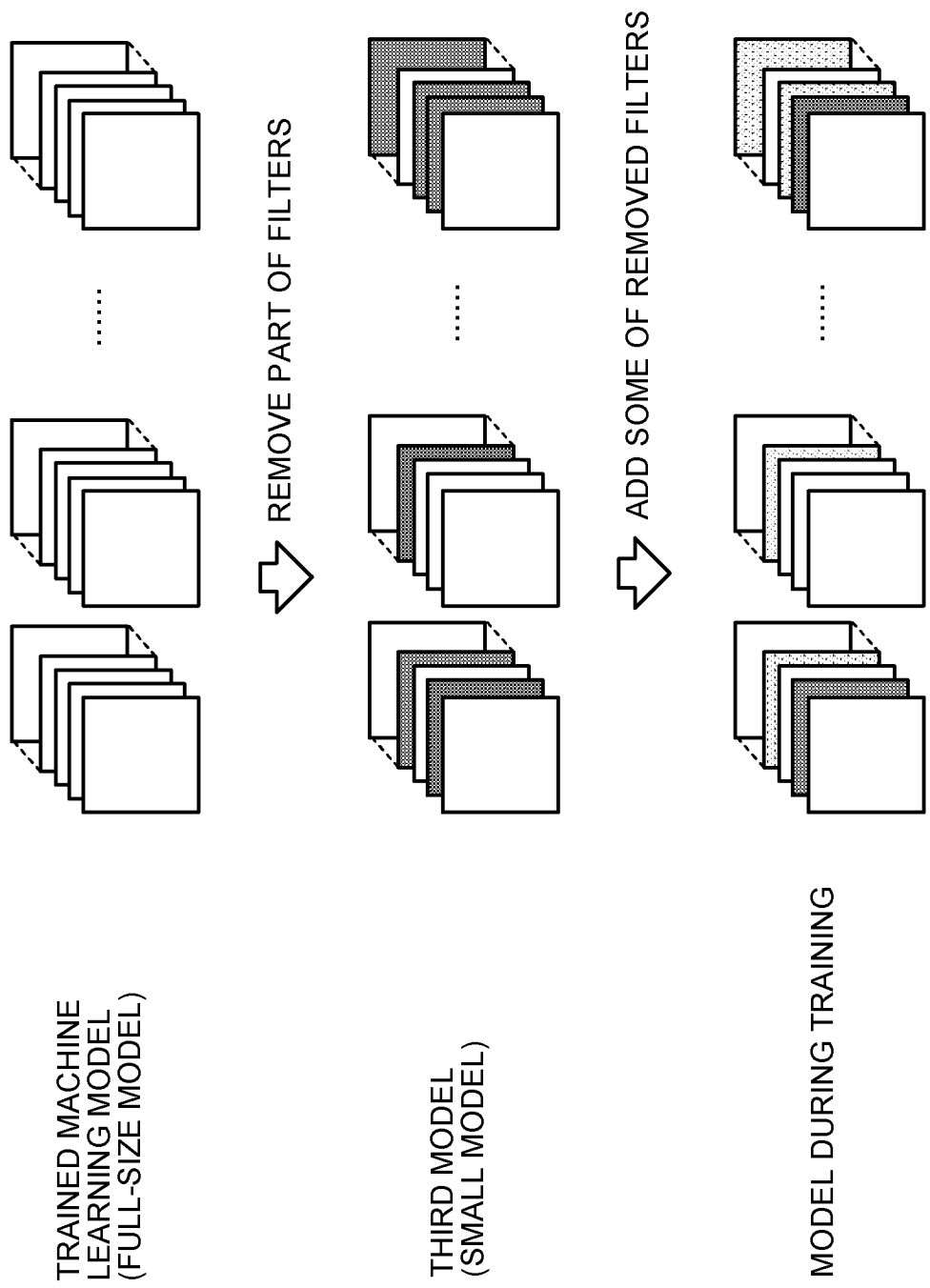

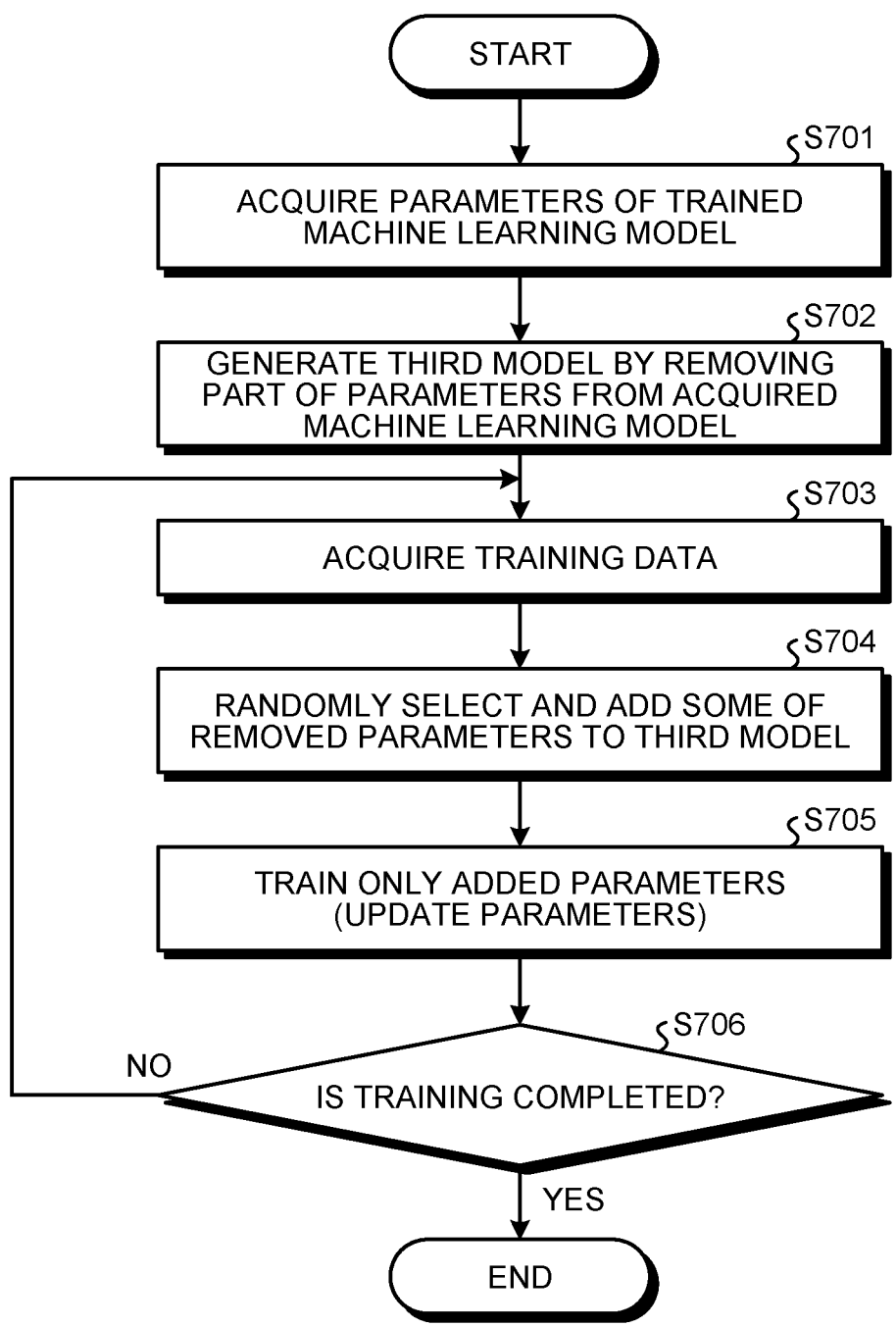

ARITHMETIC OPERATION DEVICE USING A MACHINE LEARNING MODEL, ARITHMETIC OPERATION METHOD USING A MACHINE LEARNING MODEL, AND TRAINING METHOD OF THE MACHINE LEARNING MODEL

CROSS-REFERENCE TO RELATED APPLICATIONS

This application is based upon and claims the benefit of priority from Japanese Patent Application No. 2019-170682, filed Sep. 19, 2019; the entire contents of which are incorporated herein by reference.

FIELD

Embodiments described herein relate generally to an arithmetic operation device, an arithmetic operation method, and a training method.

BACKGROUND

In general, in an inference using a machine learning model, as inference accuracy of the machine learning model becomes higher, a required computational complexity is likely to be high.

However, the computational complexity needs to be small within a range in which desired inference accuracy is satisfied from the viewpoint of a reduction in power consumption and an increase in processing speed.

BRIEF DESCRIPTION OF THE DRAWINGS

FIG. 10 is a diagram illustrating an outline of parameters (weight data) during an inference using all intermediate layers (all layers) in the characteristic data generation process of FIG. 9;

FIG. 11 is a diagram illustrating an outline of parameters (weight data) during an inference when a part of parameters are removed from the first model in the characteristic data generation process of FIG. 9;

FIG. 17 is a conceptual diagram for explaining an example of a training method in a fourth model generation process according to a second embodiment; and FIG. 18 is a flowchart illustrating an example of a fourth model generation process according to the second embodiment.

DETAILED DESCRIPTION

In general, according to one embodiment, there is provided an arithmetic operation device. The arithmetic operation device receives required performance related to an inference. The arithmetic operation device includes a processor (processing circuitry). The processor is configured to receive required performance related to an inference. The processor is configured to remove a part of parameters of a predetermined number of parameters from a first model which includes the predetermined number of parameters and is trained so as to output second data corresponding to input first data, and determine the number of bits of weight parameters according to the required performance to generate a second model. The processor is configured to input the first data into the second model to acquire data output in the second model with a smaller computational complexity than the first model.

Exemplary embodiments of an arithmetic operation device, an arithmetic operation method, and a training method will be explained below in detail with reference to the accompanying drawings. The present invention is not limited to the following embodiments.

First Embodiment

Figure 1:
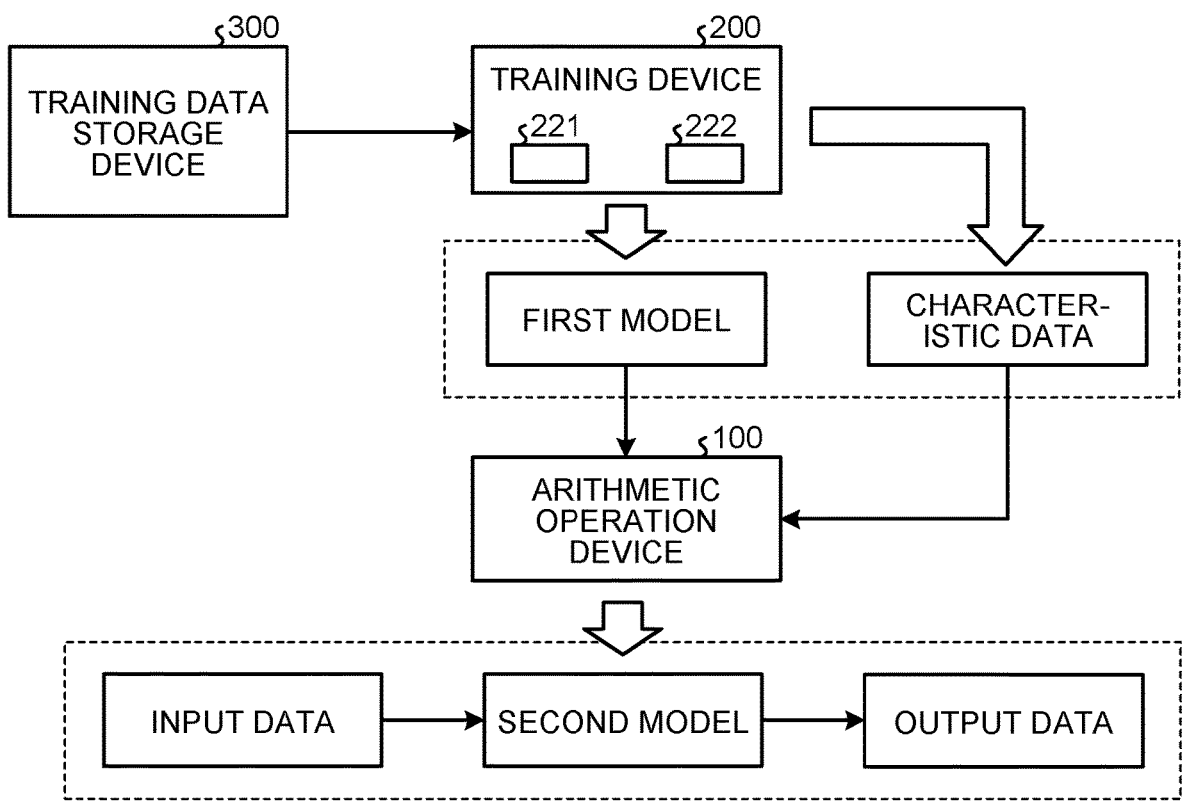
FIG. 1 is a diagram illustrating an outline of a configuration and a process of an arithmetic operation system including an arithmetic operation device according to a first embodiment.

FIG. 1 is a diagram illustrating an outline of a configuration and a process of an arithmetic operation system 1 including an arithmetic operation device 100 according to a present embodiment. As illustrated in FIG. 1, the arithmetic operation system 1 according to the present embodiment includes an arithmetic operation device 100, a training device 200, and a training data storage device 300.

The training data storage device 300 stores training data used for training a machine learning model. Here, it is assumed that the training data are a set of training samples expressed as (Xn, Yn) (n is an integer of 1 or more) with respect to a desired output (correct answer output) Yn for an input Xn. For example, a computer or a memory system having a large-capacity storage device implemented therein can be used as the training data storage device 300. The training data storage device 300 can communicate with the training device 200.

A large-capacity storage device connected so as to communicate with a computer via a cable or a communication network may be used as the training data storage device 300. A hard disk drive (HDD), a solid state drive (SSD), and an integrated circuit storage device can be appropriately used as these storage devices.

The training data are supplied from the training data storage device 300 to the training device 200. The training device 200 is a device that generates a trained machine learning model (hereinafter, referred to as a first model) by causing the machine learning model to perform a machine learning based on the supplied training data according to a training program. The training device 200 is a device that generates characteristic data indicating a correspondence between inference accuracy and a computational complexity, and are related to the first model according to the training program. Details of the generation of the first model and the generation of the characteristic data related to the first model performed by the training device 200 will be described below. The first model is a full-size machine learning model with relatively high inference accuracy. Here, the full-size machine learning model refers to a machine learning model before a part of parameters (for example, a part of intermediate layers) is removed as in a second model to be described below.

Figure 2:
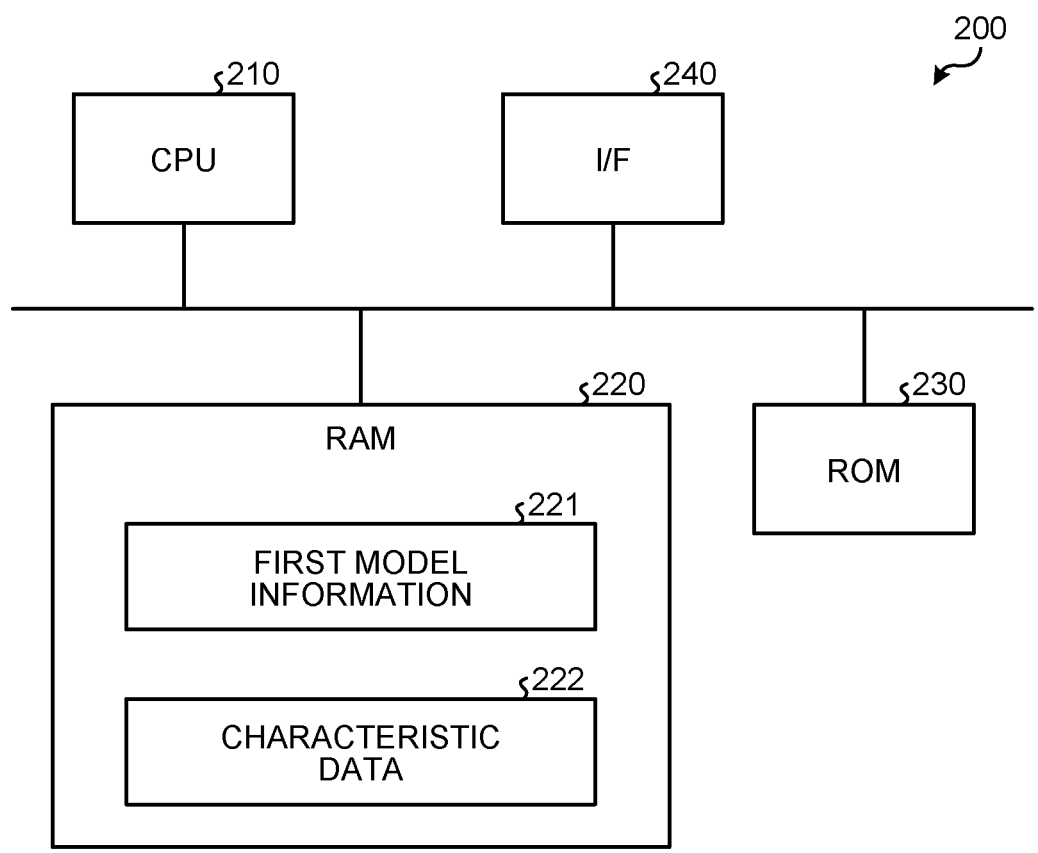
FIG. 2 is a diagram illustrating an example of a configuration of a training device in FIG. 1.

FIG. 2 is a diagram illustrating an example of a configuration of the training device 200. The training device 200 is a computer such as a workstation that includes a central processing unit (CPU) 210, a random access memory (RAM) 220, a read only memory (ROM) 230, and an I/F 240. The RAM 220 is, for example, a static RAM (SRAM), a synchronous dynamic RAM (SDRAM), or a NAND flash memory. The RAM 220 stores, as first model information 221, parameters of the generated first model. The RAM 220 stores characteristic data 222 related to the generated first model. The I/F 240 is connected so as to communicate with the training data storage device 300 or the arithmetic operation device 100 via, for example, a cable or a communication network. An I/F for the training data storage device 300 and an I/F for the arithmetic operation device 100 may be provided separately as the I/F 240. The ROM 230 stores programs and parameters for machine learning executed in the training device 200. These programs and parameters are loaded into the RAM 220, and are used in the process of the training device 200.

The training device 200 may include other processors such as a graphics processing unit (GPU) and a micro processing unit (MPU) in addition to the CPU 210 or instead of the CPU 210.

The arithmetic operation device 100 illustrated in FIG. 1 is a device that generates the second model based on the first model and the characteristic data 222 related to the first model which are generated by the training device 200. The second model is a machine learning model in which at least one neuron, at least one weight parameter, or at least one intermediate layer is removed from the full-size trained model (first model). The second model is a non-full-size machine learning model having relatively low inference accuracy relative to the first model. Details of the generation of the second model will be described below. The arithmetic operation device 100 is a device that generates output data corresponding to input data by using the generated second model.

Figure 3:
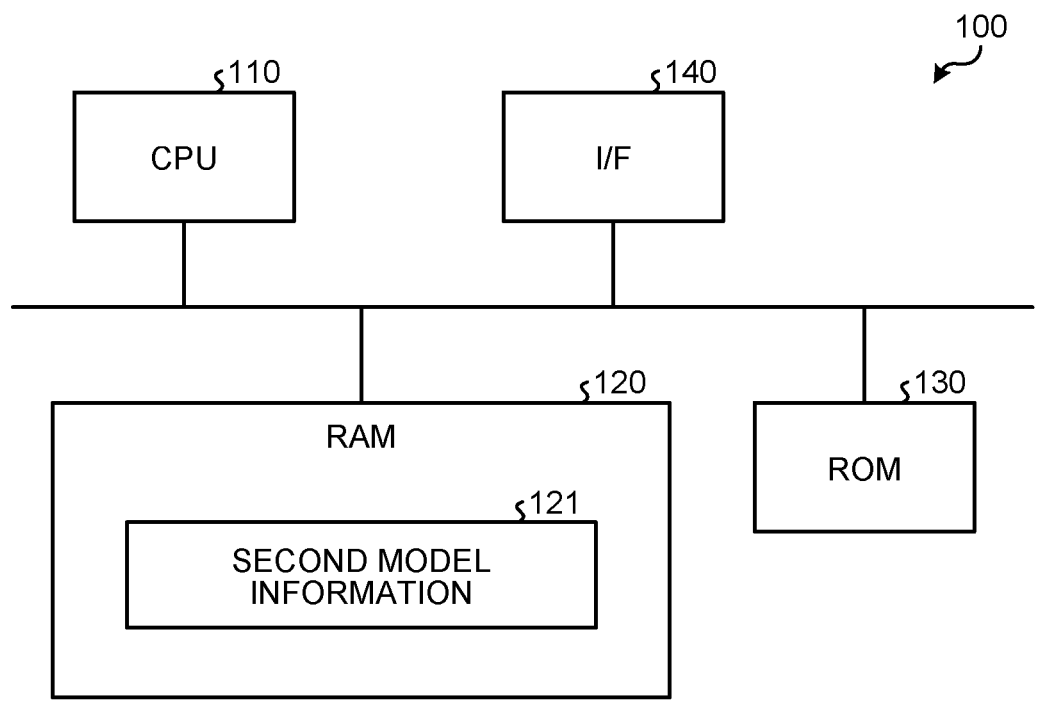
FIG. 3 is a diagram illustrating an example of a configuration of the arithmetic operation device in FIG. 1.

FIG. 3 is a diagram illustrating an example of a configuration of the arithmetic operation device 100 in FIG. 1. The arithmetic operation device 100 is a computer such as a workstation that includes a CPU 110, a RAM 120, a ROM 130, and an I/F 140. The RAM 120 is, for example, an SRAM, an SDRAM, or a NAND flash memory. The RAM 120 stores, as second model information 121, parameters of the generated second model. The I/F 140 is connected so as to communicate with the training device 200 via, for example, a cable or a communication network. The I/F 140 may include a display circuit that outputs the characteristic data related to the first model or the second model such that the characteristic data can be presented (for example, displayed) to a user, and an input circuit that receives an input from the user corresponding to the presented characteristic data related to the first model or the second model. The ROM 130 stores programs and parameters for generating the second model executed in the arithmetic operation device 100. These programs and parameters are loaded into the RAM 120, and are used in the process of the arithmetic operation device 100.

The arithmetic operation device 100 may include other processors such as a GPU and a micro processing unit (MPU) in addition to the CPU 110 or instead of the CPU 110.

The training data storage device 300 may be included in the training device 200. The arithmetic operation device 100 and the training device 200 may be implemented on a single computer. That is, the arithmetic operation device 100, the training device 200, and the training data storage device 300 may be integrally provided, or at least two devices thereof may be integrally provided, or these devices may be independent of each other.

The training device 200 and the training data storage device 300 are not limited to being connected so as to communicate with each other. The training data may be supplied from the training data storage device 300 to the training device 200 via a portable storage medium in which the training data are stored.

Figure 4:
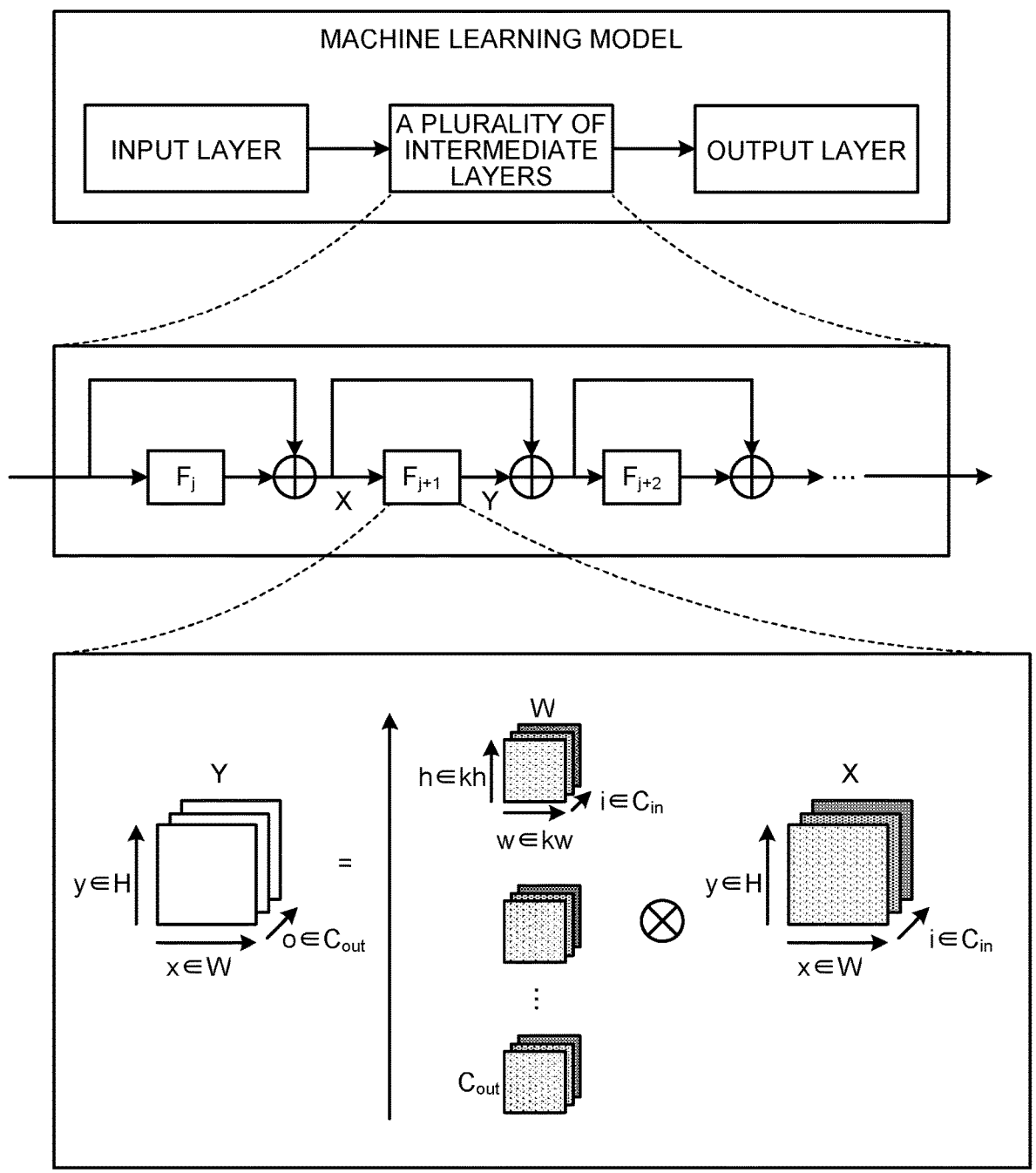
FIG. 4 is a diagram for explaining a machine learning model according to the embodiment.

Here, the machine learning model according to the present embodiment will be described. FIG. 4 is a diagram for describing the machine learning model according to the present embodiment.

In the present embodiment, a machine learning model that receives image data as an input and outputs a classification of the image data will be described as an example. That is, in the following description, the inference accuracy may be referred to as recognition accuracy. However, the machine learning model according to the present embodiment may be a machine learning model that performs any inference. For example, the machine learning model according to the present embodiment may be a machine learning model that realizes noise removal of the image data or speech recognition.

It is assumed that the machine learning model according to the present embodiment is a combined function with parameters in which a plurality of functions is combined and is defined by a combination of a plurality of adjustable functions and parameters. The machine learning model according to the present embodiment may be any combined function which is defined by the combination of the plurality of adjustable functions and parameters, but is at least a multilayer network model. In the present embodiment, an example in which the machine learning model is a convolutional neural network (CNN) model will be described. However, the machine learning model according to the present embodiment is not limited to the CNN, and may be a fully connected network. In the following description, a plurality of adjustable functions and parameters related to the machine learning model are also simply referred to as parameters of the machine learning model. That is, it is assumed that the parameters of the machine learning model according to the present embodiment include an intermediate layer, a neuron, and weight parameters of the machine learning model.

As illustrated in FIG. 4, an input layer, a plurality of intermediate layers (a plurality of convolution layers), and an output layer are provided in the machine learning model.

Data input to the input layer include image data. For example, the input layer includes nodes corresponding to the number of pixels of the image data, as nodes to which the image data are input.

Each of the plurality of intermediate layers includes a node for inputting data and a node for outputting data. In each intermediate layer, each input value from the node of the previous layer is multiplied by weight parameter, and a value obtained by an activation function by using the activation function after a bias is applied to the sum of the values obtained by multiplying the input values by the weight parameters is output from the node. For example, a rectified linear unit (ReLU) function can be used as the activation function used in the intermediate layer. Each of the plurality of intermediate layers has a path using a certain intermediate layer Fj and a path to be avoided. The path to be avoided includes a path to be removed.

Data output from the output layer includes classification results (inference results) of the input image data. In the output layer, each input value from the nodes that output pieces of data of the plurality of intermediate layers is multiplied by weight parameters, and a value obtained by an activation function by using the activation function after a bias is applied to the sum of the values obtained by multiplying the input values by the weight parameters is output from the node. For example, a linear function can be used as the activation function used in the output layer.

Here, the calculation of MAC (multiply-accumulate) using the activation function in each of the plurality of intermediate layers illustrated in FIG. 4 is expressed as follows.

$$Y_{C_{out},y,x} = \sum_{i}^{C_{in}} \sum_{h}^{kh} \sum_{w}^{kw} W_{C_{out},i,h,w} X_{i,y-h,x-w} \quad (1)$$

$$y \in [0, 1, \ldots, H-1] \quad (2)$$

$$x \in [0, 1, \ldots, W-1] \quad (3)$$

$$i \in [0, 1, \ldots, C_{in}-1] \quad (4)$$

$$o \in [0, 1, \ldots, C_{out}-1] \quad (5)$$

$$h \in [0, 1, \ldots, kh-1] \quad (6)$$

$$w \in [0, 1, \ldots, kw-1] \quad (7)$$

As illustrated in FIG. 4 and Expressions (1) to (7), the computational complexity of inferences using the machine learning model depends on the number of MAC computations and the number of bits of the weight parameters in each intermediate layer. In general, in an inference using a machine learning model, as inference accuracy of the machine learning model becomes higher, a required computational complexity is likely to be high. Under such circumstances, the computational complexity of inferences needs to be small within a range in which desired inference accuracy is obtained.

However, a relationship (characteristics) between the computational complexity and the inference accuracy depends on the number of parameters of the machine learning model and a condition during training. In other words, the machine learning model is generated for each required characteristic. Meanwhile, it is difficult to prepare the machine learning model for each required characteristic due to, for example, the limitation of a storage capacity of a storage area. When the number of bits of the weight parameters of the trained machine learning model is reduced during the inference, the computational complexity can be reduced, but there is a concern that the inference accuracy will be reduced. More specifically, a machine learning model generated according to required high inference accuracy and a machine learning model generated according to a required low computational complexity have different characteristics. Thus, the inference accuracy may be low in a case where the inference is performed by using the machine learning model generated according to the required high inference accuracy while reducing the number of bits of the weight parameters compared to a case where the inference is performed by using the machine learning model generated according to the required low computational complexity with no change.

In the embodiment, the machine learning model capable of realizing a plurality of characteristics is generated during training. For example, the plurality of characteristics is realized by removing the intermediate layer during the inference.

Figure 5:
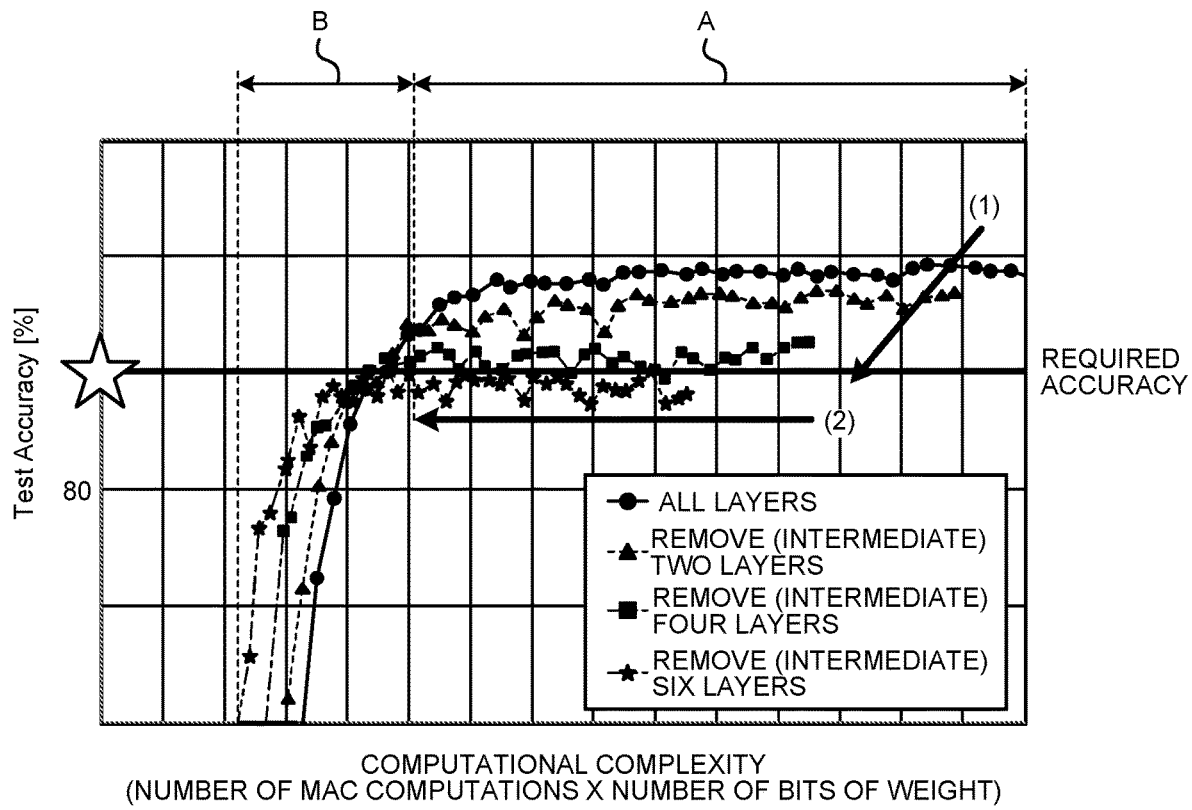
FIG. 5 is a diagram for explaining an example of a plurality of characteristics realized by the machine learning model according to the embodiment.

FIG. 5 is a diagram for describing an example of a plurality of characteristics realized by the machine learning model according to the embodiment. An example of the plurality of characteristics illustrated in FIG. 5 relates to a machine learning model (first model) obtained by training ResNet-20 by the training method according to the present embodiment by using training data of CIFAR-10. Here, the CIFAR-10 is a dataset for object category recognition. The ResNet-20 is a 20-layer residual network architecture. In the graph illustrated in FIG. 5, a vertical axis represents recognition accuracy (inference accuracy), and a horizontal axis represents the computational complexity. It is assumed that the computational complexity is represented by the product of the number of MAC computations and the number of bits of the weight parameters.

Each characteristic realized by the machine learning model (first model) according to the embodiment is expressed by the relationship between the computational complexity and the inference accuracy. In the example illustrated in FIG. 5, a circle plot illustrates the characteristic when the inference is performed by using all of the plurality of intermediate layers. A triangular plot illustrates the characteristic when the inference is performed by removing two intermediate layers. A square plot illustrates the characteristic when the inference is performed by removing four intermediate layers. A star plot illustrates the characteristic when the inference is performed by removing six intermediate layers.

According to each characteristic, the inference accuracy is saturated when the computational complexity exceeds a certain value. For example, in a range A of the computational complexity range, the inference accuracy is saturated in any characteristic. It can be seen from FIG. 5 that a saturation level becomes lower as the number of removed intermediate layers becomes larger. That is, in the range A, even though the computational complexity is identical, high inference accuracy can be realized by using the machine learning model in which the intermediate layer is not removed.

Meanwhile, for example, in a range B of the computational complexity before the inference accuracy is saturated, the inference accuracy becomes higher as the number of removed intermediate layers becomes larger unlike the case of the range A. In other words, in the range B, the computational complexity required to obtain the same level of inference accuracy becomes smaller as the number of removed intermediate layers becomes larger.

Therefore, according to the technology according to the embodiment, when the required inference accuracy is lower than the saturation level, it is possible to suppress the required computational complexity by using the machine learning model by removing the intermediate layer compared to a case where the machine learning model is used in a state in which the intermediate layer is not removed.

When the required computational complexity is not enough to saturate the inference accuracy, it is possible to increase the inference accuracy by using the machine learning model by removing the intermediate layer compared to a case where the machine learning model is used in a state in which the intermediate layer is not removed.

As stated above, the machine learning model (first model) generated by the training method according to the present embodiment can realize the plurality of characteristics. For example, the arithmetic operation system 1 selects one characteristic according to required performance (for example, required inference accuracy or required computational complexity), that is, required performance related to inference, among the plurality of characteristics capable of being realized by the first model during inference, and removes the intermediate layer such that the selected characteristic can be realized.

Figure 6:
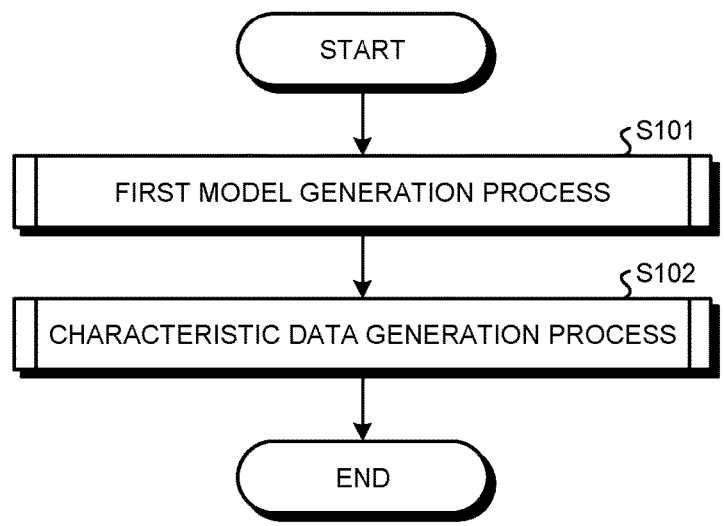
FIG. 6 is a flowchart illustrating an example of a training process of the machine learning model executed by the training device of FIG. 1.

Here, an example of an operation of the arithmetic operation system 1 according to the present embodiment during training will be described. FIG. 6 is a flowchart illustrating an example of a training process of the machine learning model executed by the training device 200 of FIG. 1. First, the training device 200 executes a first model generation process, and generates the trained machine learning model (first model) (S101). Thereafter, the training device 200 executes a characteristic data generation process, and generates characteristic data 222 indicating the relationship between the computational complexity and the inference accuracy related to the generated first model (S102).

(About First Model Generation Process)

Figure 7:
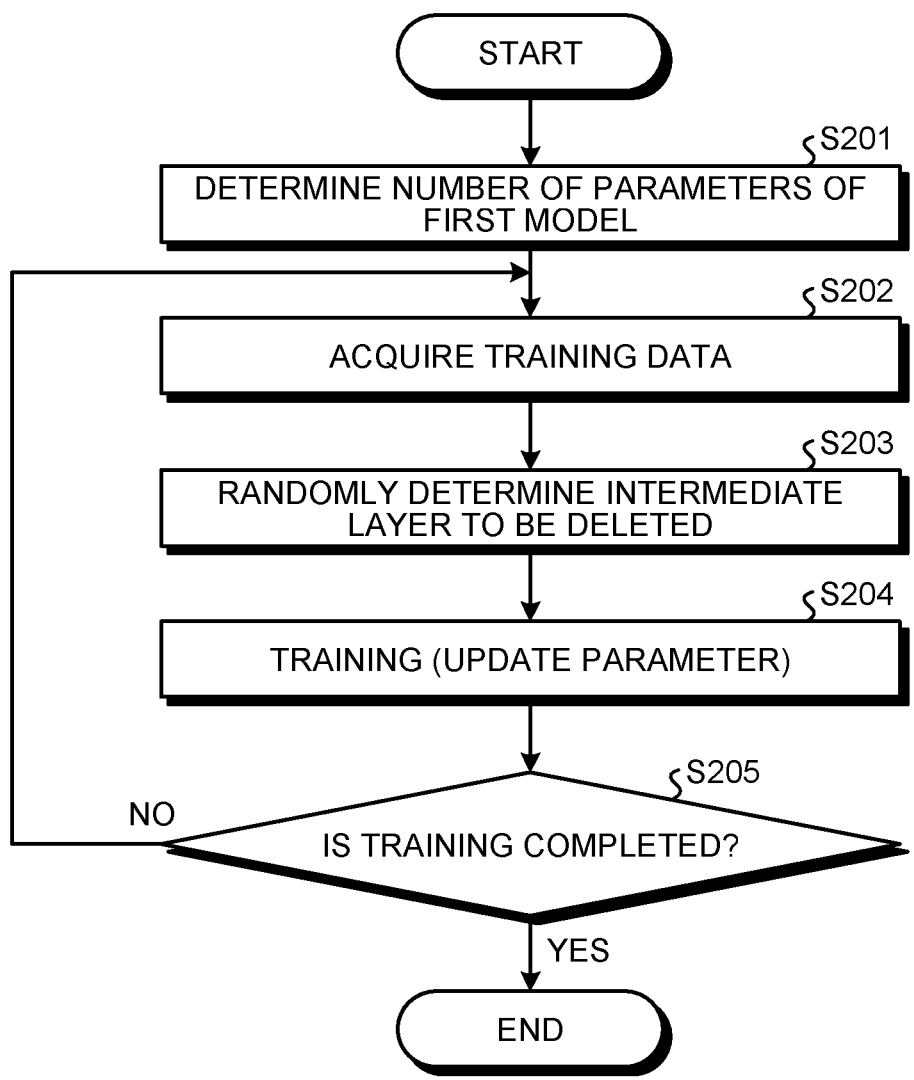
FIG. 7 is a flowchart illustrating an example of a first model generation process in the training process of FIG. 6.

Here, the first model generation process executed in S101 of FIG. 6 will be described in more detail. FIG. 7 is a flowchart illustrating an example of the first model generation process in the training process of FIG. 6.

The training device 200 determines the number of parameters of the machine learning model to be trained (S201). The number of parameters may be set in advance, and may be stored in the storage area of the training device 200. Thereafter, the training device 200 acquires the training data from the training data storage device 300 (S202), randomly determines the intermediate layer for the machine learning model to be trained (S203), and trains the machine learning model from which the intermediate layer determined from the plurality of intermediate layers is removed (S204). An updated parameter of the machine learning model is temporarily stored in the RAM 220. Thereafter, the training device 200 determines whether or not the training is completed for all the pieces of training data (S205). When the training is not completed for all the pieces of training data (S205: No), the training device 200 repeats the flow from S202 to S205, and when the training is completed for all pieces of training data (S205: Yes), the process of 7 ends.

Figure 8:
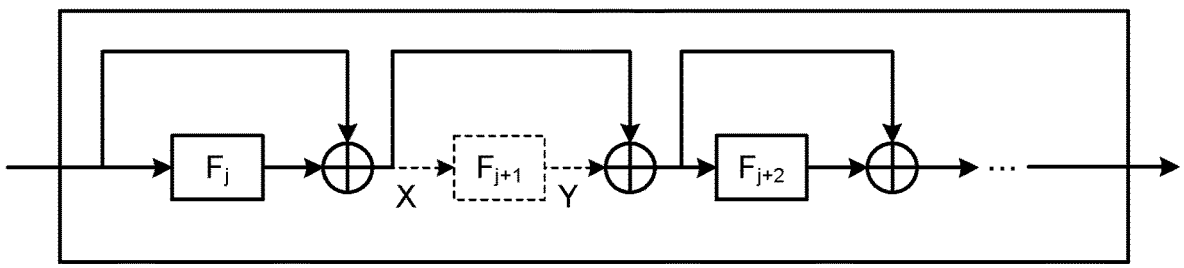
FIG. 8 is a diagram for explaining an example of a training method in the first model generation process of FIG. 7.

Here, a case where the intermediate layer of the machine learning model is removed means that the parameter of the intermediate layer is not updated during training. Specifically, a case where the intermediate layer of the machine learning model is removed means that all elements represented in Expression (5) for the intermediate layer of Expression (1). FIG. 8 is a diagram for describing an example of the training method in the first model generation process of FIG. 7. FIG. 8 illustrates three intermediate layers Fj, Fj+1, and Fj+2 of the plurality of intermediate layers. As illustrated in FIG. 8, for example, the training device 200 does not update a parameter of the intermediate layer Fj+1 which is randomly determined during training. Specifically, in the machine learning model in the state illustrated in FIG. 8, an input to the intermediate layer Fj and an output of the intermediate layer Fj are combined. Here, the combination of the input to the intermediate layer Fj and the output of the intermediate layer Fj is an input to the intermediate layer Fj+1 in the machine learning model in the state illustrated in FIG. 4. However, when the intermediate layer Fj+1 is removed as illustrated in FIG. 8, the combination of the input to the intermediate layer Fj and the output of the intermediate layer Fj is an input of the intermediate layer Fj+2. The input to the intermediate layer Fj+2 and an output of the intermediate layer Fj+2 are combined. As stated above, the training device 200 learns the machine learning model while randomly changing the intermediate layer to be removed whenever the input data (training data) changes, and generates the first model. In other words, the training device 200 generates the first model by performing ensemble training on a plurality of machine learning models having a plurality of parameters. For example, the parameters of the generated first model are stored, as first model information 221, in the RAM 220.

Although it has been described that one intermediate layer is randomly removed for each input data and the ensemble training is performed on the plurality of machine learning models having the plurality of parameters, the present invention is not limited thereto. For example, the machine learning model may be trained by randomly removing two or more intermediate layers for each input data. For example, the training is not limited to a case where the intermediate layer is removed, but the training may be performed by removing at least one neuron or at least one weight parameters for each input data. At least one neuron or at least one weight parameters may be removed for the plurality of intermediate layers. Here, a case where at least one neuron of the machine learning model is removed means that some elements represented in Expressions (2) and (3) are omitted for the intermediate layer of Expression (1). A case where at least one weight parameters of the machine learning model is removed means that some elements represented in Expressions (4) to (7) are omitted for the intermediate layer of Expression (1).

Although the training method in which the number of parameters of the machine learning model is determined and an initial value is updated while randomly removing the part of parameters has been described, the present invention is not limited thereto. For example, the aforementioned training method may be applied during re-training (Fine Tune or transfer learning) of the first model. The aforementioned training method may be applied during re-training (Fine Tune or transfer learning) of the trained machine learning model trained without removing the part of parameters. For example, the number and order of parameters to be removed are not limited to being randomly removed. The number and order of parameters to be removed may be set in advance and may be stored in the ROM 230, or may be determined based on a predetermined calculation expression stored in the ROM 230.

The machine learning model trained in this manner can realize the plurality of characteristics as illustrated in FIG. 5. In the example illustrated in FIG. 5, for example, when inference accuracy of 80% is required, it is possible to reduce the computational complexity by approximately 30% by removing six intermediate layers during the inference compared to the inference using all the intermediate layers (all the layers). That is, since the first model generated by the training device 200 according to the present embodiment is trained while randomly removing the part of intermediate layers, it is possible to realize the plurality of characteristics by changing the number of intermediate layers to be removed during the inference. In other words, a case where the parameters of the first model (first model information 221) according to the present embodiment are retained corresponds to a case where the parameters of the plurality of models having different characteristics are retained.

When the training method according to the embodiment is not applied, the machine learning model does not have the plurality of characteristics as illustrated in FIG. 5. Specifically, the characteristics in the range B in FIG. 5 are approximately identical, and the computational complexity cannot be changed even though the intermediate layer is removed. In other words, as will be described below, the computational complexity can be changed during inference according to the required performance (inference accuracy and computational complexity) by using the machine learning model trained by the training method according to the present embodiment.

(About Characteristic Data Generation Process)

Figure 9:
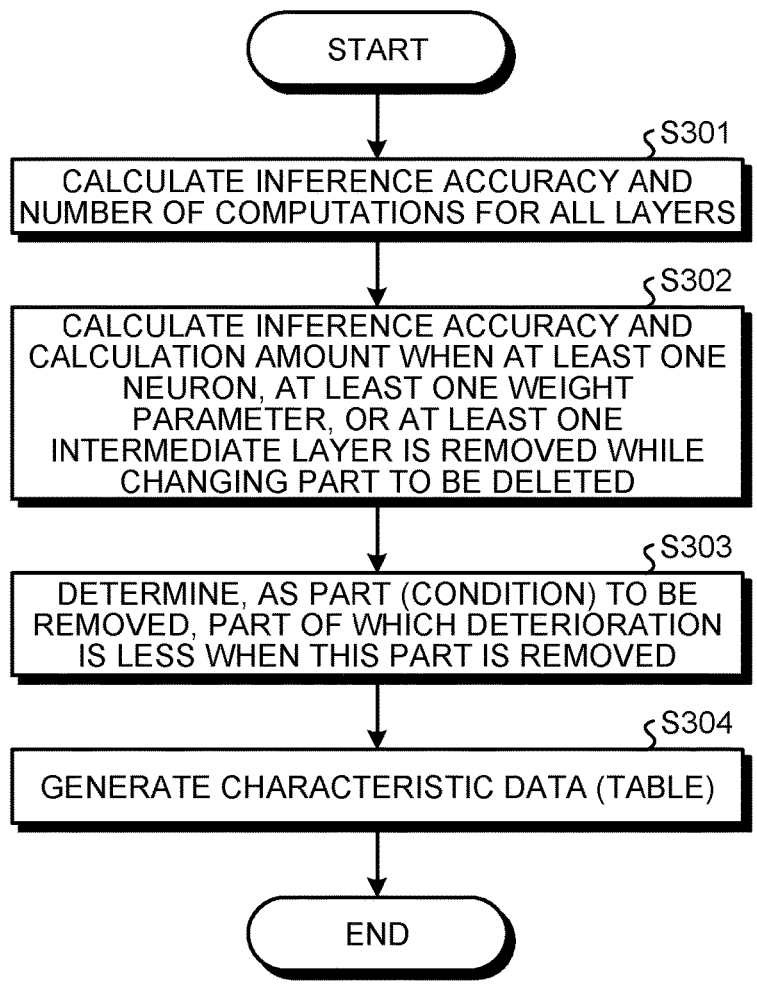
FIG. 9 is a flowchart illustrating an example of a characteristic data generation process in the training process of FIG. 6.

Here, the characteristic data generation process executed in S102 of FIG. 6 will be described in more detail. FIG. 9 is a flowchart illustrating an example of the characteristic data generation process in the training process of FIG. 6.

First, the training device 200 calculates the inference accuracy and the computational complexity using all the intermediate layers (all the layers) of the first model generated by the first model generation process illustrated in FIG. 7 (S301). FIG. 10 is a diagram illustrating an outline of the parameters (weight data) during the inference using all the intermediate layers (all the layers). In the example illustrated in FIG. 10, it is assumed that the number of the plurality of intermediate layers of the first model is L+1 layers. In S301, all the parameters of the first model are used as illustrated in FIG. 10. At this time, for example, it is assumed that the recognition accuracy (inference accuracy) is 90% and the number of times of the calculation (computational complexity) is 35M times. Here, M indicates 10 to the power of six.

Figure 12:
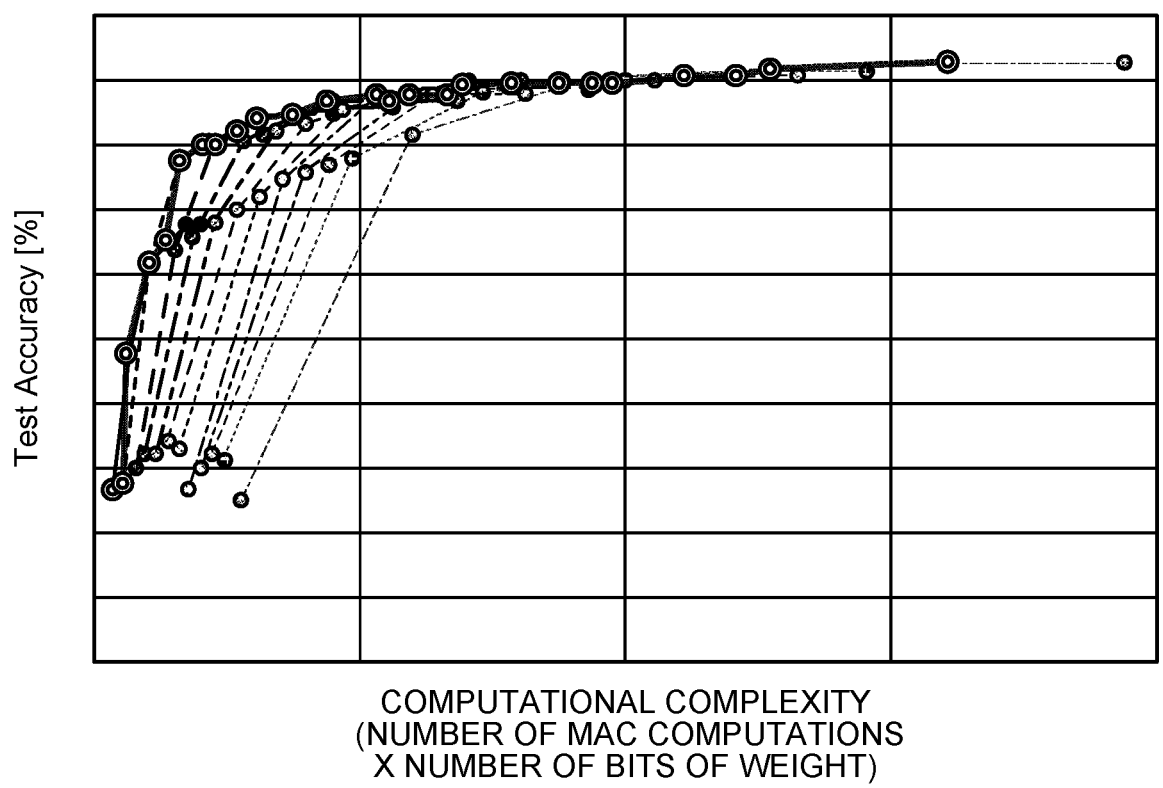
FIG. 12 is a diagram for explaining an outline of characteristics of each condition and conditions used as characteristic data.

Subsequent to S301, the training device 200 calculates the inference accuracy and the computational complexity when a part of parameters are removed from the first model (S302). FIG. 11 is a diagram illustrating an outline of the parameters (weight data) during the inference when the part of parameters are removed from the first model. Here, the part of parameters removed from the first model include at least one neuron, at least one weight parameters, or at least one intermediate layer. In S302, the inference accuracy and the computational complexity are calculated in a state in which some of all the parameters of the first model are removed as illustrated in FIG. 11. At this time, for example, it is assumed that the recognition accuracy (inference accuracy) is 89% and the number of times of the calculation (computational complexity) is 30M times. FIG. 12 is a diagram for describing an outline of characteristics of each condition and conditions used as characteristic data. In S302, the training device 200 calculates the inference accuracy and the computational complexity for each condition as illustrated in FIG. 12 while changing a part (condition) to be removed.

Thereafter, as illustrated in FIG. 9, the training device 200 specifies a condition in which a deterioration in inference accuracy is less when this condition is removed among the plurality of conditions (S303). The training device 200 generates the characteristic data 222 by associating the specified condition (the part to be removed) with the inference accuracy and the computational complexity under this condition (S304). For example, the characteristic data 222 are generated as a table. For example, the generated characteristic data 222 are stored in the RAM 220. A condition in which the highest inference accuracy is obtained in each computational complexity based on the characteristics obtained in S302 is used as the characteristic data 222 as illustrated by a thick solid line and a double-circle plot in FIG. 12. After S303, the flow of FIG. 9 ends.

S303 and S304 may be executed in the arithmetic operation device 100 during the inference to be described below. In this case, the correspondence between the inference accuracy and the computational complexity related to each condition obtained in S302 is stored as the characteristic data 222.

Figure 13:
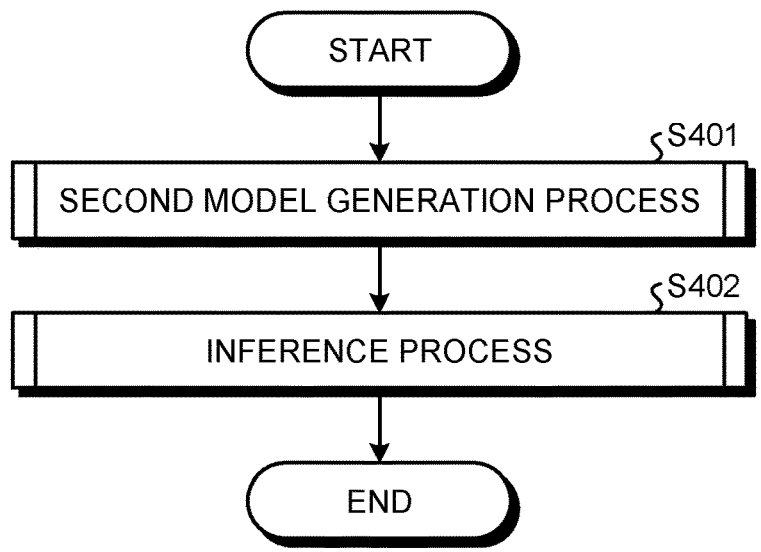
FIG. 13 is a flowchart illustrating an example of a computational complexity reduction process of the machine learning model executed by the arithmetic operation device of FIG. 1.

Here, an example of an operation of the arithmetic operation system 1 according to the present embodiment during the inference (operating) will be described. FIG. 13 is a flowchart illustrating an example of a computational complexity reduction process of the machine learning model executed by the arithmetic operation device 100 of FIG. 1.

The arithmetic operation device 100 removes a part of parameters from the first model, and executes a second model generation process of generating the second model based on the first model information 221 and the characteristic data 222 generated by the training device 200 (S401). The arithmetic operation device 100 executes an inference process of inferring with a smaller computational complexity than the inference using the first model by using the generated second model (S402).

(About Second Model Generation Process)

Figure 14:
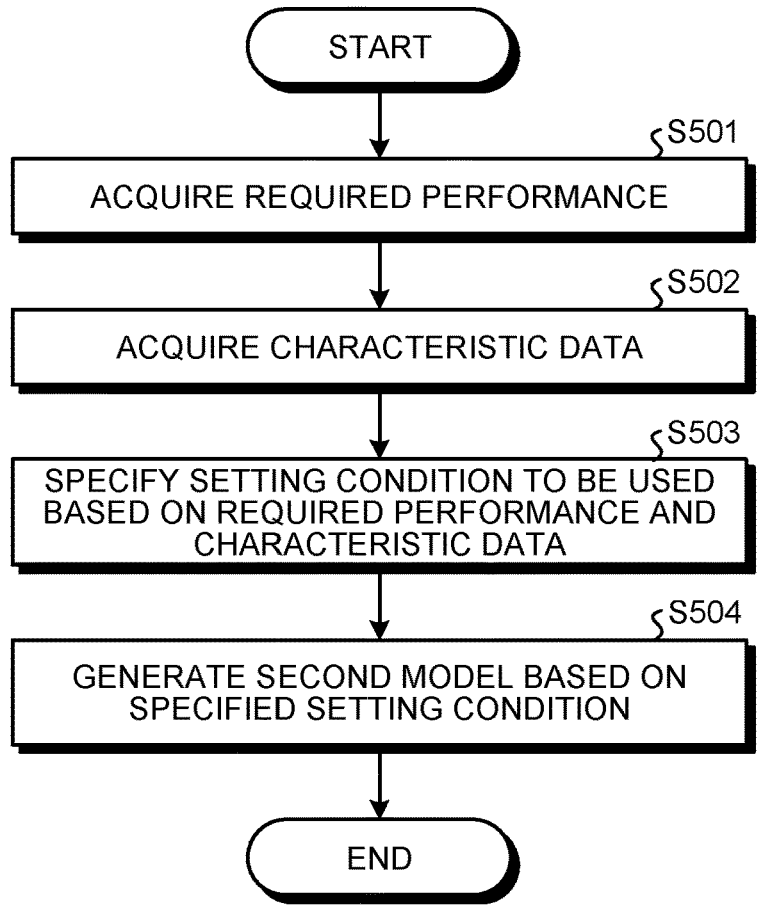
FIG. 14 is a flowchart illustrating an example of a second model generation process in the computational complexity reduction process of FIG. 13.

Here, the second model generation process executed in S401 of FIG. 13 will be described in more detail. FIG. 14 is a flowchart illustrating an example of the second model generation process in the computational complexity reduction process of FIG. 13.

The arithmetic operation device 100 acquires the required performance (inference accuracy and computational complexity) (S501). The required performance is input by the user, and is acquired via, for example, the I/F 140. The arithmetic operation device 100 acquires the characteristic data 222 (S502). The characteristic data 222 are acquired from the training device 200 via, for example, the I/F 140.

Figure 15:
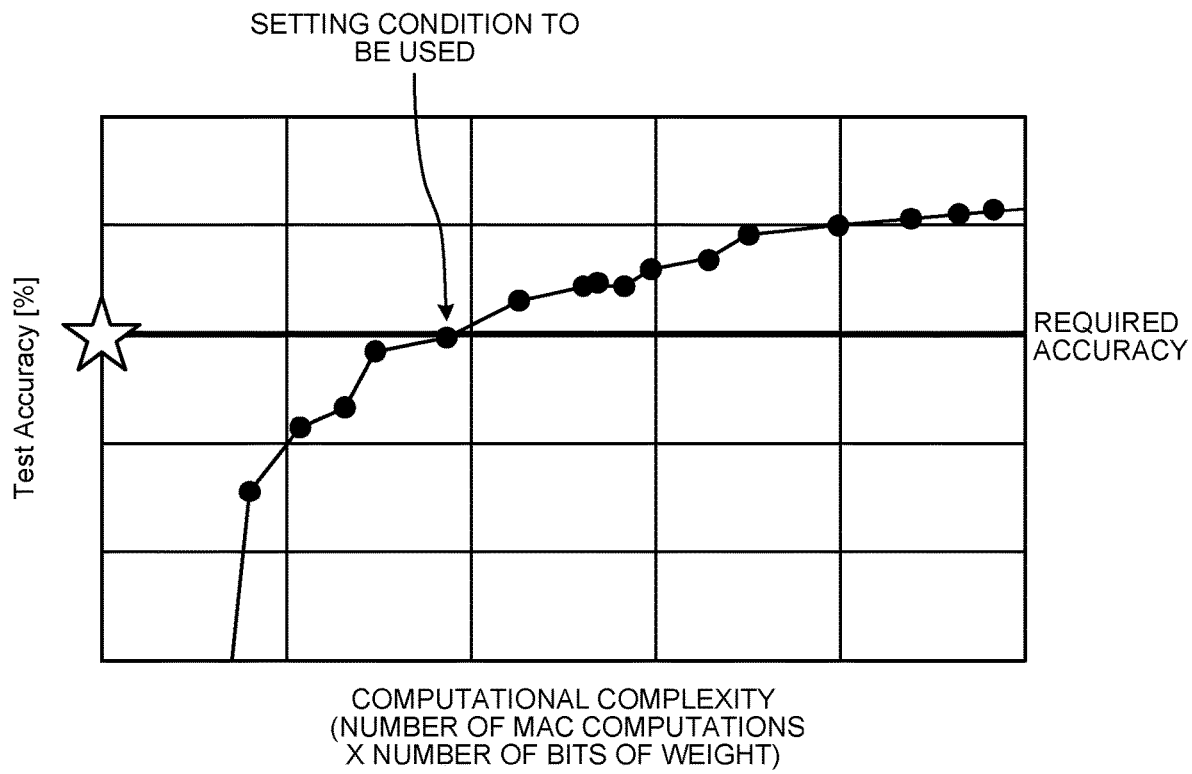
FIG. 15 is a diagram for explaining specification of a setting condition in the second model generation process of FIG. 14.

FIG. 15 is a diagram for describing specification of a setting condition in the second model generation process of FIG. 14. As illustrated in FIG. 15, the arithmetic operation device 100 specifies the setting condition to be used based on the required performance and characteristic data (S503). Here, each condition, the inference accuracy and the computational complexity under each condition are associated in the characteristic data 222. That is, in S503, the arithmetic operation device 100 specifies the part (condition) to be removed based on the required performance and characteristic data 222.

For example, the arithmetic operation device 100 removes some of all the parameters of the first model as represented by an arrow (1) in FIG. 5, and generates the second model in which the number of bits of the weight parameters is decreased as represented by an arrow (2) in FIG. 5 based on the specified setting condition, that is, the specified condition (S504). The parameters of the generated second model are stored, as the second model information 121, in the RAM 120. Thereafter, the second model generation process ends.

For example, the characteristic data 222 illustrated in FIG. 15 may be presented to the user in the second model generation process. In this case, the user specifies the setting condition that satisfies the desired performance, and inputs the setting condition via, for example, the I/F 140. The arithmetic operation device 100 specifies the part to be removed based on the input setting condition, and generates the second model.

The required performance may be determined by the arithmetic operation device 100. For example, in S501, the arithmetic operation device 100 may calculate the required computational complexity according to the number of processors such as the CPU inside the arithmetic operation device 100, a usage rate of the processor, the capacity of the storage area, and the usage amount of the storage area. In this case, the arithmetic operation device 100 can specify a part (condition) to be automatically removed according to the calculated computational complexity and the characteristic data 222. In other words, the arithmetic operation device 100 can obtain an inference result by automatically generating an optimal second model according to a load at that time.

(About Inference Process)

Figure 16:
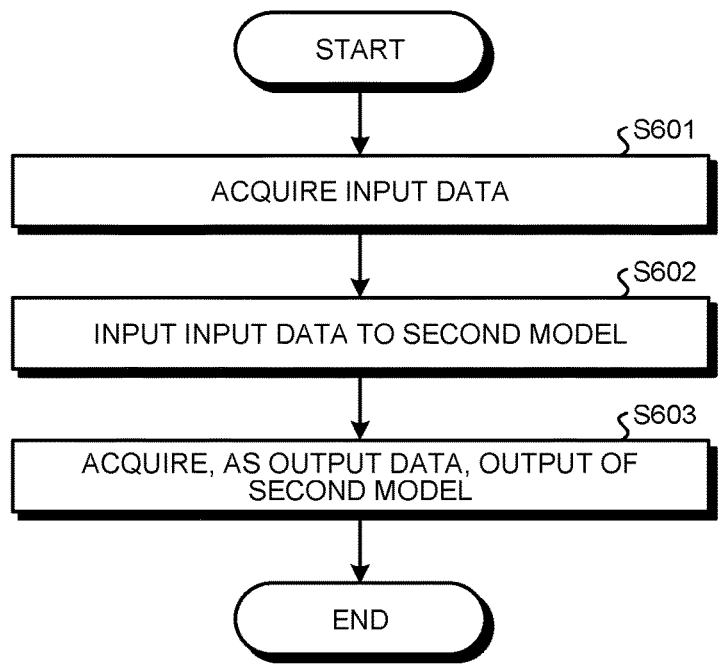
FIG. 16 is a flowchart illustrating an example of an inference process in the computational complexity reduction process in FIG. 13.

Here, the inference process executed in S402 of FIG. 13 will be described in more detail. FIG. 16 is a flowchart illustrating an example of the inference process in the computational complexity reduction process in FIG. 13.

The arithmetic operation device 100 acquires input data (S601), inputs the acquired input data to the second model loaded in the RAM 120 (S602), and acquires the output of the second model corresponding to the input data (S603). Thereafter, the inference process ends.

As stated above, the arithmetic operation device 100 according to the present embodiment generates the second model in which at least one neuron, at least one weight parameters, or at least one intermediate layer is removed from the first model. The arithmetic operation device 100 executes the inference by using the generated second model. According to this configuration, the arithmetic operation device 100 can perform the inference by reducing the computational complexity within a range of desired inference accuracy. A second inference result obtained by the inference using the second model corresponds to a first inference result obtained by the inference using the first model. That is, the second inference result can be used as the first inference result obtained with a small computational complexity. However, the first inference result and the second inference result may be different depending on the required performance.

As described above, the arithmetic operation system 1 according to the present embodiment generates the first model capable of realizing the plurality of characteristics and generates the characteristic data 222 indicating the relationship between the computational complexity and the inference accuracy related to the plurality of characteristics by training while removing the intermediate layer. Here, the intermediate layer to be removed is randomly selected, for example. The arithmetic operation system 1 generates the second model by removing the part of parameters from the first model (arrow (1) in FIG. 5) and removing the number of bits of the weight parameters (arrow (2) in FIG. 5) according to the required performance, and performs the inference b using the generated second model. According to this configuration, it is possible to perform the inference with a small computational complexity within a range that satisfies the required performance compared to a case where the first model is used. That is, according to the technology according to the present embodiment, it is possible to change the computational complexity during inference according to the required accuracy without retaining the parameters of the plurality of models having different characteristics.

Second Embodiment

Although it has been described in the aforementioned embodiment that the machine learning model (first model) capable of realizing the plurality of characteristics is generated by training the machine learning model while removing the part of parameters of the machine learning model, the present invention is not limited thereto. Here, another training method of generating a machine learning model (fourth model) capable of realizing the plurality of characteristics will be described.

FIG. 17 is a conceptual diagram for describing an example of a training method in a fourth model generation process according to the present embodiment. As illustrated in FIG. 17, in the training method in the fourth model generation process according to the present embodiment, a fourth model which is larger than the third model and is capable of realizing the plurality of characteristics is generated by updating only a parameter related to an added weight filter while randomly adding some weight filters to a small model (third model). The fourth model is a full-size machine learning model corresponding to the first model, but is likely to have different parameters from those of the first model. Here, the full-size machine learning model refers to a machine learning model which corresponds to a machine learning model before the part of parameters are removed as in the aforementioned second model and corresponds to a machine learning model after some parameters are added to the third model to be described below.

Although an example in which a part (parameter) of the weight filters is randomly added to the small model (third model) will be described in the following description, the present invention is not limited to a case where the number and order of parameters to be removed are random. The number and order of parameters to be removed may be set in advance and may be stored in the ROM 230, or may be determined based on a predetermined calculation expression stored in the ROM 230.

Here, the training method in the fourth model generation process according to the present embodiment will be described in more detail. FIG. 18 is a flowchart illustrating an example of the fourth model generation process according to the present embodiment.

The training device 200 acquires the parameters of the trained machine learning model (S701), removes at least one weight parameters (weight filter) from the acquired machine learning model, and generates the third model (S702). The trained machine learning model is, for example, the aforementioned full-size machine learning model, but the number of parameters may be larger or smaller than the number of parameters of the fourth model (first model).

The training device 200 acquires the training data as in S202 in FIG. 7 (S703), randomly selects some weight filters of at least one weight filter removed in S702, and returns the selected weight filter to the third model (S704). At this time, when the number of weight filters removed in S702 is one, the randomly selected some weight filters are the weight filters removed in S702. Thereafter, the training device 200 trains the third model to which some of the removed weight filters are added (S705). However, in this training, it is assumed that only the parameter related to the randomly added weight filter is updated, and other parameters are fixed without being updated.

The training device 200 repeats the flow of S703 to S706 when the training is not completed for all the pieces of training data (S706: No), and ends the process of FIG. 18 when the training is completed for all the pieces of training data (S706: Yes).

It is assumed that the number of parameters of a plurality of fourth models having a plurality of characteristics generated from the trained machine learning model according to the present embodiment is larger than the number of parameters of the third model.

Although it has been described in the present embodiment that only the parameter related to the randomly added weight filter is updated and the other parameters are fixed, the present invention is not limited thereto. For example, a batch normalization (BN) layer of the convolution layer, the activation layer, and the BN layer provided in each of the plurality of intermediate layers may be updated together with the added weight filter. In this case, after the updated weight filter and a parameter related to the BN layer are stored in the RAM 220, the third model may be further trained in a state in which the added weight filter is removed again. At this time, the parameter related to the BN layer updated together with the added weight filter is updated again. According to this configuration, it is possible to obtain a parameter related to an appropriate BN layer for both the model to which the weight filter is added and the model to which the weight filter is not added.

Although it has been described in the present embodiment that the third model is generated by removing at least one weight parameters (weight filter) from the trained machine learning model (full-size model), the present invention is not limited thereto.

For example, the third model may be generated from the full-size machine learning model in which the number of parameters is determined and an initial parameter is set, or may be generated from the first model according to the first embodiment.

For example, the parameter removed or added from or to the third model is not limited to the weight filter, and may be at least one neuron, at least one weight parameters, or at least one intermediate layer. The parameter removed or added from or to the third model may be two or more of neurons, weight parameters, and intermediate layers.

Although it has been described in the present embodiment that the fourth model is generated by using the third model generated from the full-size machine learning model, the present invention is not limited thereto. For example, the trained small model (third model) may be acquired, and the training may be performed while randomly adding the weight filter of which the initial value is set to the third model.

The third model (small model) may not be generated. For example, the fourth model may be generated by randomly selecting some parameters of the acquired trained machine learning model and training only the parameter selected for each input data.

As described above, the training device 200 according to the present embodiment generates the fourth model by randomly adding the weight filter to the third model for each input data and by training the third model. According to this configuration, similar to the first embodiment, it is possible to generate the machine learning model (fourth model) capable of realizing the plurality of characteristics. Here, as described above, the number of parameters of the fourth model may be identical to or larger or smaller than the number of parameters of the first model according to the first embodiment.

Although the training method of generating the fourth model by randomly updating only some weight filters has been described in the present embodiment, the present invention is not limited thereto. For example, only some of the at least one removed intermediate layers may be randomly updated in the third model in which at least one intermediate layer is removed. For example, only some of the at least one removed neuron may be randomly updated in the third model in which at least one neuron is removed.

The training method according to the present embodiment may be applied during re-training (Fine Tune or transfer learning). Here, the machine learning model to be re-trained may be the first model according to the first embodiment, or the trained machine learning model trained without removing the part of parameters. In these cases, the third model is generated by removing the part of parameters from the machine learning model to be re-trained. During re-training, some of the removed parameters are randomly selected (added).

In the arithmetic operation system 1 according to the aforementioned embodiments, the learning may be performed by removing two or more parameters of the neuron, the weight parameters (weight filter), and the intermediate layer, or the training may be performed by randomly selecting (adding) these parameters.

According to at least one of the aforementioned embodiments, it is possible to provide the arithmetic operation device capable of changing the computational complexity during the inference.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An arithmetic operation device, comprising:
   a memory configured to store a first machine learning model that includes a predetermined number of parameters and is trained so as to output second data corresponding to input first data;
   processing circuitry configured to execute an arithmetic operation using the first machine learning model stored in the memory; and
   an interface connected to the processing circuitry, wherein the processing circuitry is further configured to
   receive the first data and a required performance related to an inference through the interface, the required performance being provided from outside the arithmetic operation device and including an accuracy of inference using a machine learning model and a computational complexity based on a product of a number of multiply-accumulate computations and a number of bits of weight parameters, remove a part of parameters of the predetermined number of parameters from the first machine learning model and decrease the number of bits of weight parameters according to the required performance to generate a second machine learning model, wherein a second accuracy of inference using the second machine learning model is lower than a first accuracy of inference using the first machine learning model but satisfies the received required performance, input the first data into the second machine learning model to acquire third data output from the second machine learning model with a smaller computational complexity than the first machine learning model, and output the third data through the interface.

2. The arithmetic operation device according to claim 1, wherein the first data are image data, and data output corresponding to the input first data are an inference result related to a classification of the image data in the first machine learning model and the second machine learning model.

3. An arithmetic operation method performed by an arithmetic operation device, the arithmetic operation device including a memory configured to store a first machine learning model that includes a predetermined number of parameters and is trained so as to output second data corresponding to input first data, processing circuitry configured to execute the arithmetic operation method, and an interface connected to the processing circuitry, the method comprising:

receiving the first data and a required performance related to an inference through the interface, the required performance being provided from outside the arithmetic operation device and including an accuracy of inference using a machine learning model and a computational complexity based on a product of a number of multiply-accumulate computations and a number of bits of weight parameters;

removing a part of parameters of the predetermined number of parameters from the first machine learning model and decreasing the number of bits of weight parameters according to the required performance to generate a second machine learning model, wherein a second accuracy of inference using the second machine learning model is lower than a first accuracy of inference using the first machine learning model but satisfies the received required performance;

inputting the first data into the second machine learning model to acquire third data output from the second machine learning model with a smaller computational complexity than the first machine learning model; and outputting the third data through the interface.

4. The arithmetic operation device according to claim 1, wherein the parameters include at least one of a neuron, a weight parameter, and an intermediate layer.

5. The arithmetic operation device according to claim 4, wherein the removed part of the parameters includes at least one neuron, at least one weight parameter, or at least one intermediate layer.

6. The arithmetic operation device according to claim 1, wherein the first machine learning model is a machine learning model trained while removing the part of the parameters of the predetermined number of parameters from a machine learning model having the predetermined number of parameters for each training data.

7. The arithmetic operation device according to claim 6, wherein the part of the parameters of the predetermined number of parameters are randomly removed from the machine learning model having the predetermined number of parameters.

8. The arithmetic operation device according to claim 6, wherein the first machine learning model is generated by re-training the trained machine learning model having the predetermined number of parameters.

9. The arithmetic operation device according to claim 1, wherein the part of the parameters of the predetermined number of parameters is removed based on a relationship between inference accuracy and a computational complexity related to the first machine learning model.

10. The arithmetic operation device according to claim 9, wherein the memory is further configured to store the parameters of the first machine learning model and the relationship between the inference accuracy and the computational complexity related to the first machine learning model.

11. The arithmetic operation device according to claim 10, wherein the relationship between the inference accuracy and the computational complexity related to the first machine learning model is stored in association with a parameter that is removed during the inference among the predetermined number of parameters.

12. The arithmetic operation device according to claim 1, wherein the first machine learning model is a machine learning model trained while adding a parameter to a third machine learning model having a smaller number of parameters than the predetermined number for each training data.

13. The arithmetic operation device according to claim 12, wherein the parameter is randomly added to the third machine learning model.

14. The arithmetic operation device according to claim 12, wherein the third machine learning model is generated by removing the part of the parameters of the predetermined number of parameters from a trained machine learning model having the predetermined number of parameters, and the added parameter is one of parameters removed when the third machine learning model is generated.

15. The arithmetic operation device according to claim 12, wherein the third machine learning model is a trained machine learning model, and the first machine learning model is generated by re-training the third machine learning model.

16. The arithmetic operation device according to claim 12, wherein the first machine learning model is trained by updating the added parameter.

17. The arithmetic operation device according to claim 16, wherein the first machine learning model is trained by updating a parameter of a normalization layer of the third machine learning model in addition to the added parameter.

18. The arithmetic operation method according to claim 3, wherein the first machine learning model is a machine learning model trained while adding a parameter to a third machine learning model having a smaller number of parameters than the predetermined number for each training data.

19. A training method of a machine learning model having a predetermined number of parameters, the training method being performed by a training device, the training device including a memory storing the machine learning model, processing circuitry configured to execute the training the machine learning model using the memory, and an interface connected to the processing circuitry, the method comprising:

receiving training data through the interface;

training the predetermined number of parameters for the received training data by using the machine learning model to generate a first machine learning model having a plurality of characteristics, wherein the training includes training a parameter other than a part of parameters of the predetermined number of parameters while removing the part of the parameters multiple times;

performing a plurality of inferences on the first machine learning model having the predetermined number of parameters generated by the training performed multiple times under a plurality of conditions in which another part of parameters different from each other are removed among the predetermined number of parameters;

calculating a relationship between a computational complexity and an accuracy of inference using the first machine learning model for the conditions based on results of the plurality of inferences, the computational complexity being based on a product of a number of multiply-accumulate computations and a number of bits of weight parameters;

generating characteristic data indicating the relationship between the computational complexity and the accuracy of inference related to the first machine learning model, wherein the characteristic data allows specifying the computational complexity from the accuracy of inference; and outputting through the interface, the first machine learning model and the characteristic data.

20. The arithmetic operation device according to claim 1, wherein the first machine learning model and the second machine learning model are convolutional neural network models.

* * * * *